(12) United States Patent
Park et al.

(10) Patent No.: US 9,171,496 B2
(45) Date of Patent: Oct. 27, 2015

(54) IMAGE CONTROL DISPLAY DEVICE AND IMAGE CONTROL METHOD

(71) Applicant: Samsung Display Co., Ltd., Yongin (KR)

(72) Inventors: Jong-Woong Park, Yongin (KR); Byung-Ki Chun, Yongin (KR); Yong-Seok Choi, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 77 days.

(21) Appl. No.: 13/945,792

(22) Filed: Jul. 18, 2013

(65) Prior Publication Data

US 2014/0292820 A1    Oct. 2, 2014

(30) Foreign Application Priority Data

Mar. 26, 2013   (KR) .................. 10-2013-0032242

(51) Int. Cl.
*G09G 3/32*     (2006.01)
*G06T 1/20*     (2006.01)

(52) U.S. Cl.
CPC ............. *G09G 3/3208* (2013.01); *G06T 1/20* (2013.01); *G09G 3/3233* (2013.01)

(58) Field of Classification Search
None
See application file for complete search history.

(56) References Cited

U.S. PATENT DOCUMENTS

| | | | | |
|---|---|---|---|---|
| 8,207,934 | B2* | 6/2012 | Plut | 345/102 |
| 2010/0174930 | A1* | 7/2010 | Kim et al. | 713/320 |

FOREIGN PATENT DOCUMENTS

| | | |
|---|---|---|
| KR | 10-2008-0014226 A | 2/2008 |
| KR | 10-2008-0034690 A | 4/2008 |
| KR | 10-2011-0043310 A | 4/2011 |
| KR | 10-2012-0056361 A | 6/2012 |

* cited by examiner

*Primary Examiner* — Joseph Haley
(74) *Attorney, Agent, or Firm* — Knobbe, Martens, Olson & Bear LLP

(57) ABSTRACT

An image control technology that enables low power consumption with less compromise in the overall quality of the image is disclosed, in which color information of an image is saved while minimizing degradation of picture quality, and improving text readability. In one aspect, an image control display device includes an image controller configured to measure at least one of luminance values and chroma values of pixels of an input image. In addition, the image controller is configured to detect an edge using the at least one of luminance and chroma values and is configured to invert color information of the input image into inverted image data. The image controller is further configured to generate output image data comprising an inverted region and an exception region, where the inverted region displays the inverted image data and the exception region displays uninverted input image data. The display device additionally includes a data driver configured to receive the output image data and to apply a plurality of data voltages corresponding to the output image data to a display panel.

18 Claims, 9 Drawing Sheets

IMAGE CONTROL DISPLAY DEVICE AND IMAGE CONTROL METHOD

CROSS-REFERENCE TO RELATED APPLICATION

This application claims priority to and the benefit of Korean Patent Application No. 10-2013-0032242 filed in the Korean Intellectual Property Office on Mar. 26, 2013, the entire contents of which are incorporated herein by reference.

BACKGROUND

1. Field

The disclosed technology relates generally to a low power display device and an image control method. More particularly, the disclosed technology relates to a display device which reduces power consumption by converting the background of an image into black and converting the text of the image into white.

2. Description of the Related Technology

In general, some low power display devices employ image control methods whereby white portions of an image having high luminance are converted to another color having low luminance.

However, methods that convert white portions of an image into another color with low luminance often suffer from degraded contrast between the text and the background, resulting in reduced readability of the text. Moreover, when the image is a photograph, white portions of the photograph are also converted to another color, resulting in degraded quality of the photograph.

In addition, some low power display devices employ a rendering method, in which both the color of the background and the text of the input image are inverted.

However, while such rendering methods improve readability of the text resulting from increased contrast between the text and the background, when a photograph is included in an image, the photograph is also inverted, rendering photograph difficult to recognize.

The information disclosed in the Description of the Related Technology section is intended for enhancement of understanding of the background of the invention. Accordingly, it does not constitute admission of prior art that is already known in this country to a person of ordinary skill in the art.

SUMMARY OF CERTAIN INVENTIVE ASPECTS

In order to solve the above-described problem, embodiments described herein provide a low power consumption image control technology of saving color information of an image, minimizing damage of picture quality, and improving readability of a text.

An image control display device according to one embodiment includes an image controller for measuring at least one of luminance and chroma using input image data, detecting an edge using measured information to detect an exception region, and generating output image data in which an inverted region that is a region excluding the exception region is displayed in accordance with inverted image data obtained by inverting color information of an input image and the exception region is displayed in accordance with the input image data to transmit the generated output image data to a data driver and a data driver for applying a plurality of data voltages in accordance with the output image data to a display panel.

The image controller includes a measuring unit for measuring luminance and chroma of each pixel of an input image and transmitting measured luminance and chroma data to an edge detecting unit and an inverted image generator, an edge detecting unit for selecting a pixel as a center pixel and detecting an edge pixel using edge data calculated by performing convolution on peripheral pixel values corresponding to a Sobel operator with respect to peripheral pixel values of the center pixel, an inverted image generator for generating inverted image data obtained by inverting color information of the input image to transmit the generated inverted image data to an image combining unit, a box detecting unit for detecting a box surrounded by the detected edge from the input image and transmitting a position of a box region to an image combining unit, and an image combining unit for detecting the box region from the inverted image as the exception region to generate output image data in which the exception region is displayed in accordance with the input image data and an inverted region excluding the exception region is output in accordance with the inverted image data.

The edge detecting unit uses a luminance data value of a maximum luminance pixel of the input image that is measured by the measuring unit as a maximum value and a luminance data value of a minimum luminance pixel as a minimum value, calculates a threshold value corresponding to a predetermined first reference value in consideration of the maximum value, and compares the edge data with the threshold value to determine the center pixel as an edge pixel when the edge data is greater than or equal to the threshold value.

The edge detecting unit performs convolution on peripheral pixel values corresponding to a Sobel operator with respect to peripheral pixel values of the center pixel from a first pixel of a first row of a display panel to an adjacent pixel in at least one direction of an X direction and a Y direction to detect an edge pixel.

The edge detecting unit transmits edge data including coordinates and grayscale values of the detected edge pixel to the box detecting unit.

In a case where the plurality of edge pixels form an X direction line segment, when a length of the X direction line segment is greater than or equal to a second reference value of an X direction length of an input image, the box detecting unit recognizes the X direction line segment as an X direction line segment of a box. In a case where the plurality of edge pixels form a Y direction line segment, when a length of the Y direction line segment is greater than or equal to a third reference value of a Y direction length of an input image, the box detecting unit recognizes the Y direction line segment as a Y direction line segment of a box.

The box detecting unit recognizes a region surrounded by a pair of X direction line segments and a pair of Y direction line segments and including four edges as a box region and transmits a position of the box region including coordinates of the box region to the image combining unit.

The image controlling unit according to one embodiment uses the box region as an exception region in an inverted image transmitted by the inverted image generator to generate output image data in which the exception region is displayed as the image signal as it is and a region excluding the exception region is displayed as the inverted image and to transmit the generated output image data to the data driver.

The image controller includes a measuring unit for measuring luminance and chroma of each pixel of an input image and transmitting measured luminance and chroma data to an edge detecting unit and an inverted image generator, an edge detecting unit for selecting a pixel as a center pixel, performing convolution on peripheral pixel values corresponding to a Sobel operator with respect to peripheral pixel values of the center pixel to calculate edge data, and detecting an edge pixel using the calculated edge data, an inverted image generator for calculating chroma of each pixel of the input image, not inverting color information of a pixel image whose chroma is greater than or equal to a predetermined fifth reference value, and inverting color information of a pixel image whose chroma is less than the fifth reference value to transmit the color information to an image combining unit, and an image combining unit for detecting a pixel region whose chroma is greater than or equal to the fifth reference value as the exception region to generate an output image in which the exception region is displayed in accordance with the input image data and an inverted region excluding the exception region is output in accordance with the inverted image data.

The image controller includes a measuring unit for measuring luminance and chroma of each pixel of an input image and transmitting measured luminance and chroma data to an edge detecting unit and an inverted image generator, an edge detecting unit for selecting a pixel as a center pixel, performing convolution on peripheral pixel values corresponding to a Sobel operator with respect to peripheral pixel values of the center pixel to calculate edge data, and detecting an edge pixel using the calculated edge data, an inverted image generator for calculating chroma of each pixel of the input image, not inverting color information of a pixel image whose chroma is greater than or equal to a predetermined sixth reference value, and inverting color information of a pixel image whose chroma is less than the sixth reference value to transmit the color information to an image combining unit, a box detecting unit for detecting a box surrounded by the detected edge from the input image and transmitting a position of a box region to an image combining unit, and an image combining unit for detecting a pixel region whose chroma is greater than or equal to the sixth reference value and the box region as the exception regions to generate output image data in which the exception regions are displayed in accordance with the input image data and inverted regions excluding the exception regions are output in accordance with the inverted image data.

The image combining unit calculates a ratio of the sum of the input image grayscale values to the sum of maximum grayscale values and generates the output image data when the ratio is larger than a predetermined seventh reference value to transmit the generated output image data to the data driver.

The edge detecting unit includes a luminance controller for controlling the first reference value.

The box detecting unit includes a box size controller for controlling the second reference value and the third reference value.

The inverted image generator includes a first chroma controller for controlling the fifth reference value.

The inverted image generator includes a second chroma controller for controlling the sixth reference value.

An image control method according to one embodiment includes measuring luminance and chroma of each pixel of an input image and transmitting measured luminance and chroma data, selecting a pixel as a center pixel and detecting an edge pixel using edge data calculated by performing convolution on peripheral pixel values corresponding to a Sobel operator with respect to peripheral pixel values of the center pixel, generating inverted image data obtained by inverting color information of the input image, detecting a box surrounded by the detected edge from the input image, and detecting the box region from the inverted image as the exception region to generate output image data in which the exception region is displayed in accordance with the input image data and an inverted region excluding the exception region is output in accordance with the inverted image data.

An image control method according to one embodiment includes measuring luminance and chroma of each pixel of an input image and transmitting measured luminance and chroma data, selecting a pixel as a center pixel, performing convolution on peripheral pixel values corresponding to a Sobel operator with respect to peripheral pixel values of the center pixel to calculate edge data, and detecting an edge pixel using the calculated edge data, calculating chroma of each pixel of the input image not to invert color information of a pixel image whose chroma is greater than or equal to a predetermined fifth reference value and to invert color information of a pixel image whose chroma is less than the fifth reference value, and detecting a pixel region whose chroma is greater than or equal to the fifth reference value as the exception region to generate an output image in which the exception region is displayed in accordance with the input image data and an inverted region excluding the exception region is output in accordance with the inverted image data.

An image controlling method according to one embodiment includes measuring luminance and chroma of each pixel of an input image and transmitting measured luminance and chroma data, selecting a pixel as a center pixel, performing convolution on peripheral pixel values corresponding to a Sobel operator with respect to peripheral pixel values of the center pixel to calculate edge data, and detecting an edge pixel using the calculated edge data, calculating chroma of each pixel of the input image not to invert color information of a pixel image whose chroma is greater than or equal to a predetermined sixth reference value and to invert color information of a pixel image whose chroma is less than the sixth reference value, detecting a box surrounded by the detected edge from the input image and transmitting a position of a box region, and detecting a pixel region whose chroma is greater than or equal to the sixth reference value and the box region as the exception regions to generate output image data in which the exception regions are displayed in accordance with the input image data and inverted regions excluding the exception regions are output in accordance with the inverted image data.

The image control method further includes calculating a ratio of the sum of the input image grayscale values to the sum of maximum grayscale values and generating the output image data when the ratio is larger than a predetermined seventh reference value to transmit the generated output image data to the data driver.

One embodiment provides a low power consumption image control technology of saving color information of an image and minimizing damage of picture quality.

DETAILED DESCRIPTION OF CERTAIN INVENTIVE EMBODIMENTS

Figure 1:
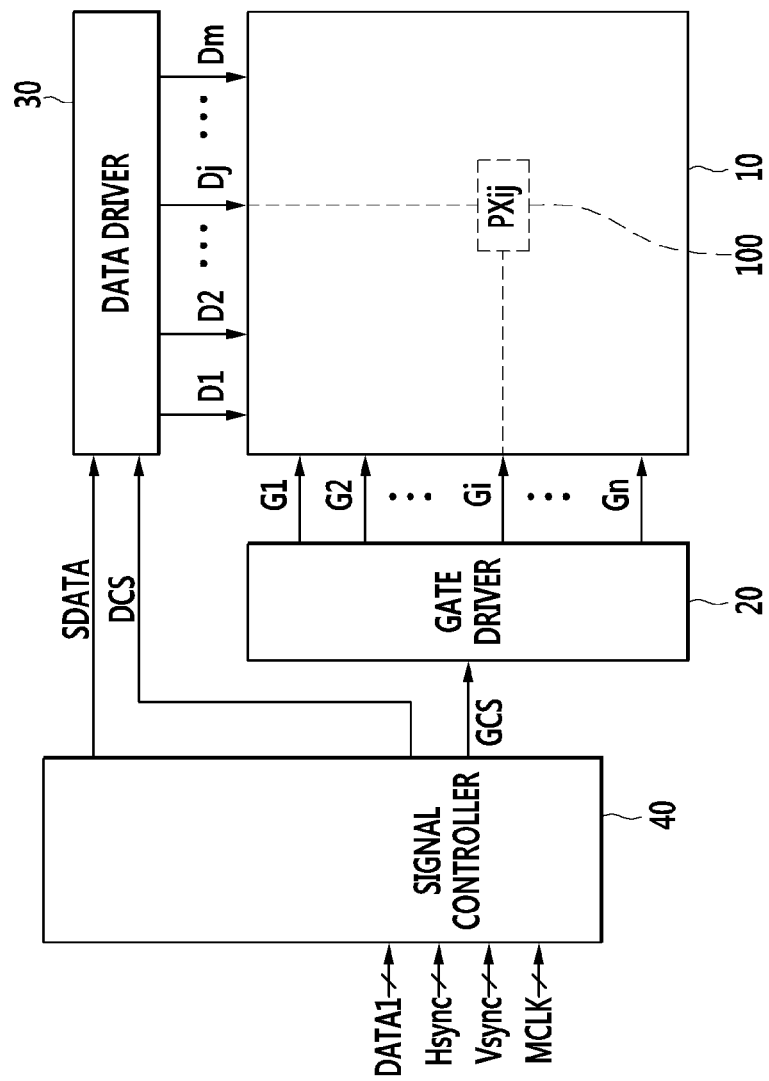
FIG. 1 is a view illustrating a display device including an image controller according to one embodiment.

Hereinafter, exemplary embodiments will be described in detail with reference to the accompanying drawings. As those skilled in the art would realize, the described embodiments may be modified in various different ways, all without departing from the spirit or scope of the present invention. In addition, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

FIG. 1 is a view illustrating an image control display device according to one embodiment.

As illustrated in FIG. 1, an image control display device according to one embodiment includes a display panel 10 including a plurality of pixels 100, a gate driver 20, a data driver 30, and a signal controller 40 for controlling the display panel 10, the gate driver 20, and the data driver 30.

The display panel 10 includes the plurality of pixels 100 positioned at intersections of a plurality of gate lines G1 to Gn and a plurality of data lines D1 to Dm. Each of the plurality of pixels 100 may consist of sub-pixels (not shown) of RGB colors.

The plurality of pixels are connected to the corresponding gate lines among the plurality of gate lines G1 to Gn and the corresponding data lines among the plurality of data lines D1 to Dm and the plurality of pixels are arranged in a matrix.

The plurality of gate lines G1 to Gn may be arranged in a row direction of the plurality of pixels 100 and the plurality of data lines D1 to Dm may run parallel with each other in a column direction of the plurality of pixels 100.

The gate driver 20 is configured to be controlled by a gate driving control signal GCS supplied from the signal controller 40 and generates a plurality of gate signals to transmit the generated gate signals to the plurality of gate lines G1 to Gn connected to the display panel 10.

The gate driver 20 may include a shift register for sequentially generating the plurality of gate signals in response to a start signal for controlling a start of a scan operation in the gate driving control signal GCS of the signal controller 40 and a level shift for shifting voltages of the plurality of gate signals to levels suitable for driving the plurality of pixels.

The data driver 30 is configured to sample an output image data SDATA in accordance with a data driving control signal DCS supplied from the signal controller 40, latches the sampled output image data SDATA by one line, and converts the latched output image data into a plurality of data voltages to supply the plurality of data voltages to the plurality of data lines D1 to Dm.

At this time, the output image data SDATA transmitted to the data driver 30 is image data converted by an image controller 50 according to an exemplary embodiment of one embodiment.

As used herein, an edge of an image refers to a part in which chroma or luminance is changed by an amount greater than or equal to a predetermined reference value. The edge of an image provides information on a position, a shape, a size, and a pattern of a surface of an object in an image. The edge is a part in which luminance or chroma of an image is changed from a small value to a large value or from a large value to a small value.

Since the edge is a part in which a relatively large difference in luminance (or chroma) exists in the image, the edge exists in a break point of a pixel image value or a break point of a pixel image differential value. In one embodiment, an edge value includes information on whether a corresponding pixel corresponds to an edge.

In addition, according to an exemplary embodiment, luminance and chroma are measured using input image data DATA1 and an exception region is detected from a predetermined target region using measured information. The detected exception region is displayed in accordance with image data that represents color information of an input image and an inverted region obtained by excluding the exception region from the target region is displayed in accordance with inverted image data obtained by inverting the color image of the input image. An operation converting the image data that represents the color information of the input image by the above-described method is referred to as image conversion.

The output image data SDATA according to the illustrated exemplary embodiment includes the image data of the exception region and the inverted image data of the inverted region.

The signal controller 40 is connected to the gate driver 20 and the data driver 30 receives an input image signal data DATA1, a horizontal synchronizing signal Hsync, a vertical synchronizing signal Vsync, and a clock signal MCLK from the outside and is configured to generate the control signals GCS and DCS for controlling the gate driver 20 and the data driver 30 to transmit the generated control signals GCS and DCS.

The signal controller 40 may receive RGB image signals including red (R), blue (B), and green (G) grayscale data as input images DATA1.

The signal controller 40 includes the image controller 50 and the image controller 50 generates the output image data SDATA to transmit the generated output image data SDATA to the data driver 30.

In the display device of FIG. 1, an image converted by the image controller 50 may be confirmed by a user through the display panel 10.

Figure 2:
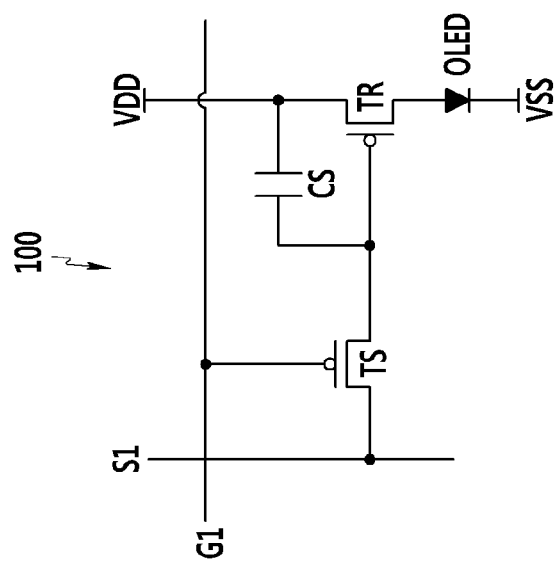
FIG. 2 is a view illustrating a pixel circuit of a display panel according to one embodiment.

FIG. 2 is a view illustrating a pixel circuit of a display according to one embodiment.

As illustrated in FIG. 2, a pixel circuit 100 of the display panel 10 includes a switching transistor TS, a driving transistor TR, and a storage capacitor CS. A voltage VSS is connected to a cathode electrode of an organic light emitting diode (OLED).

The switching transistor TS includes a gate electrode connected to a gate signal wiring line G1 and a first electrode and a second electrode connected to a data wiring line S1.

The driving transistor TR includes a gate electrode connected to the second electrode of the switching transistor TS, a source electrode connected to a voltage VDD, and a drain electrode connected to an anode electrode of the organic light emitting diode (OLED).

A storage capacitor CS is connected between the gate electrode and the source electrode of the driving transistor TR.

When the switching transistor TS is turned on by a scan signal of a gate-on voltage transmitted through the gate wiring line G1, a data signal is transmitted to the gate electrode of the driving transistor TR through the data wiring line S1. A voltage in accordance with the data signal transmitted to the gate electrode of the driving transistor TR is maintained by the storage capacitor CS.

Then, a driving current in accordance with the voltage maintained by the storage capacitor CS flows to the driving transistor TR. The driving current flows to the organic light emitting diode (OLED) and the organic light emitting diode (OLED) emits light with luminance in accordance with the driving current.

Figure 3:
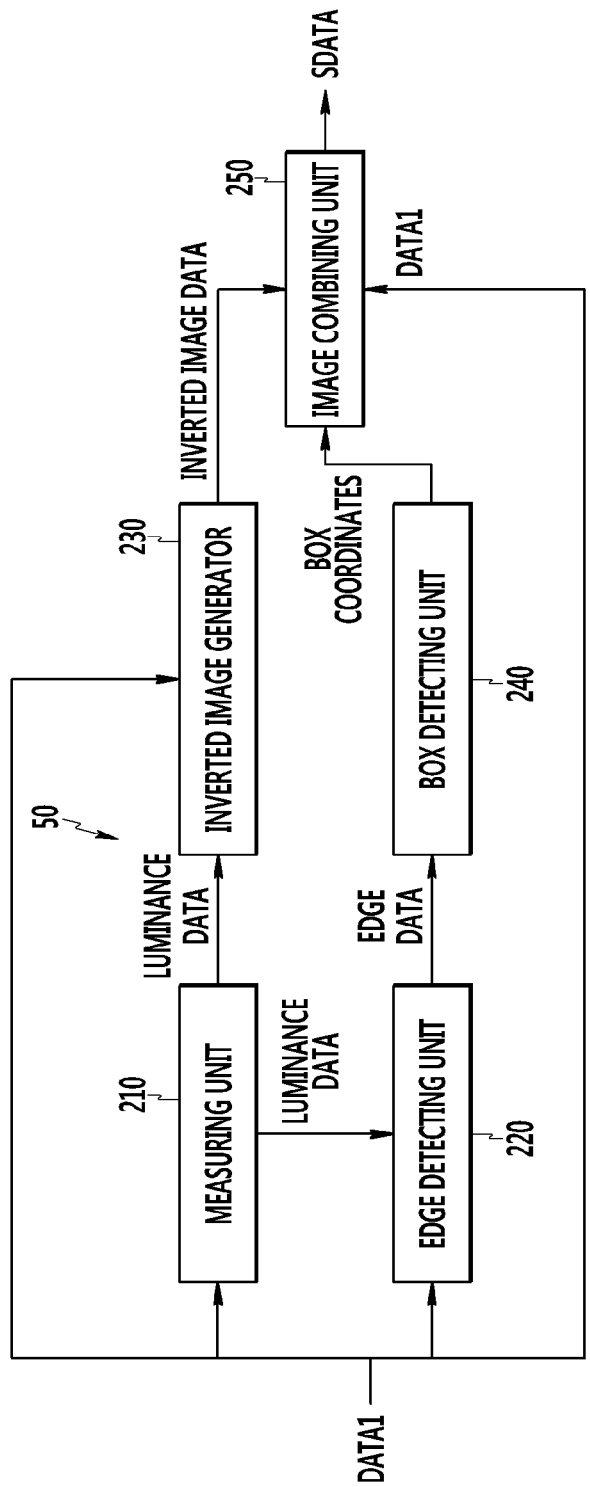
FIG. 3 is a block diagram illustrating an image controller according to one embodiment.

FIG. 3 is a block diagram illustrating an image controller according to one embodiment.

Figure 4:
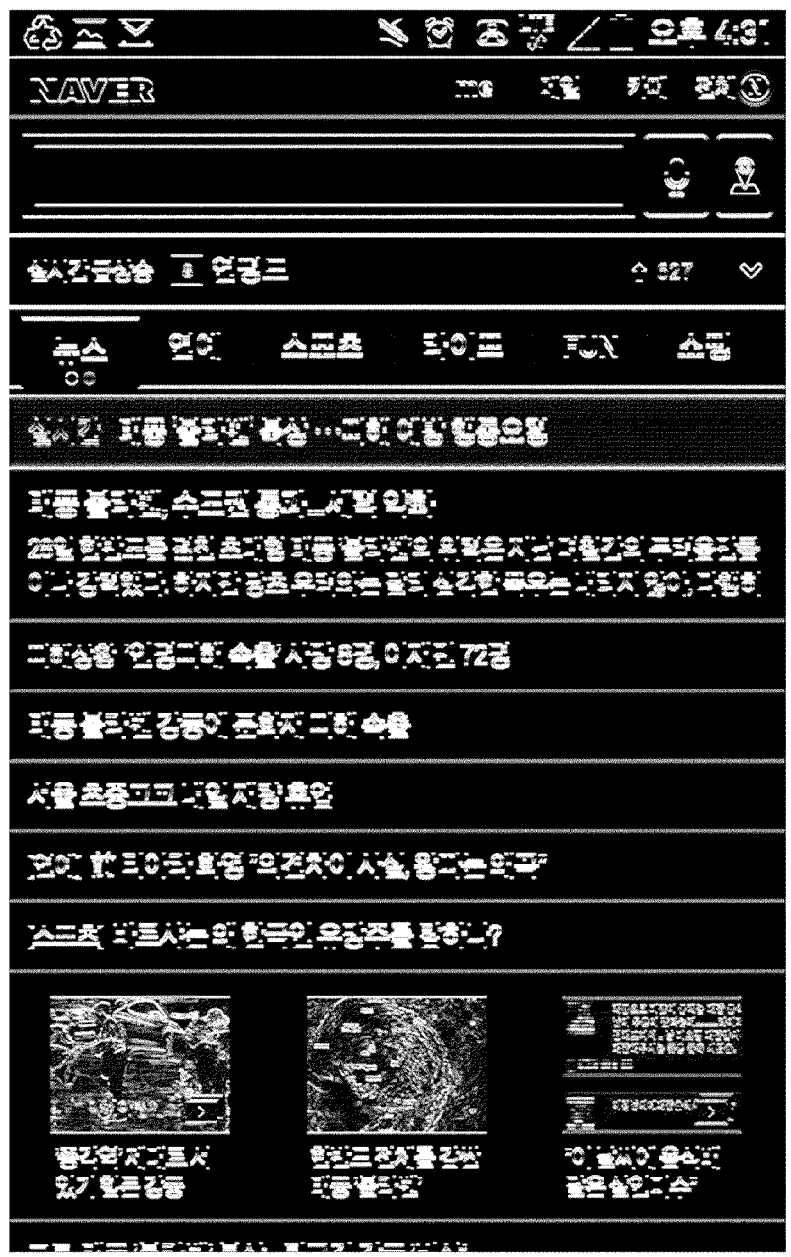
FIG. 4 is a view illustrating a horizontal direction edge detecting screen of an edge detecting unit according to one embodiment.

FIG. 4 is a view illustrating a horizontal direction edge detecting screen of an edge detecting unit according to one embodiment.

Figure 5:
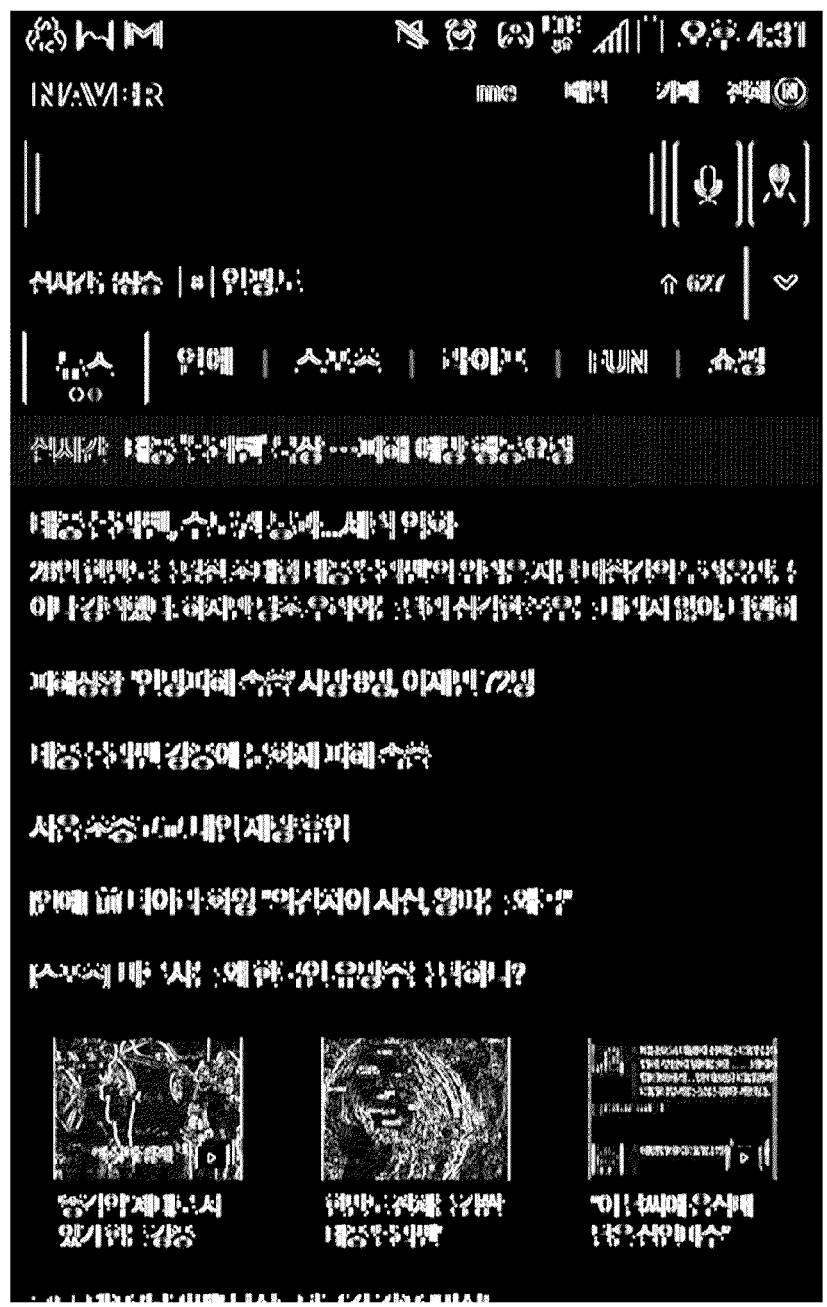
FIG. 5 is a view illustrating a vertical direction edge detecting screen of an edge detecting unit according to one embodiment.

FIG. 5 is a view illustrating a vertical direction edge detecting screen of an edge detecting unit according to one embodiment.

Figure 6:
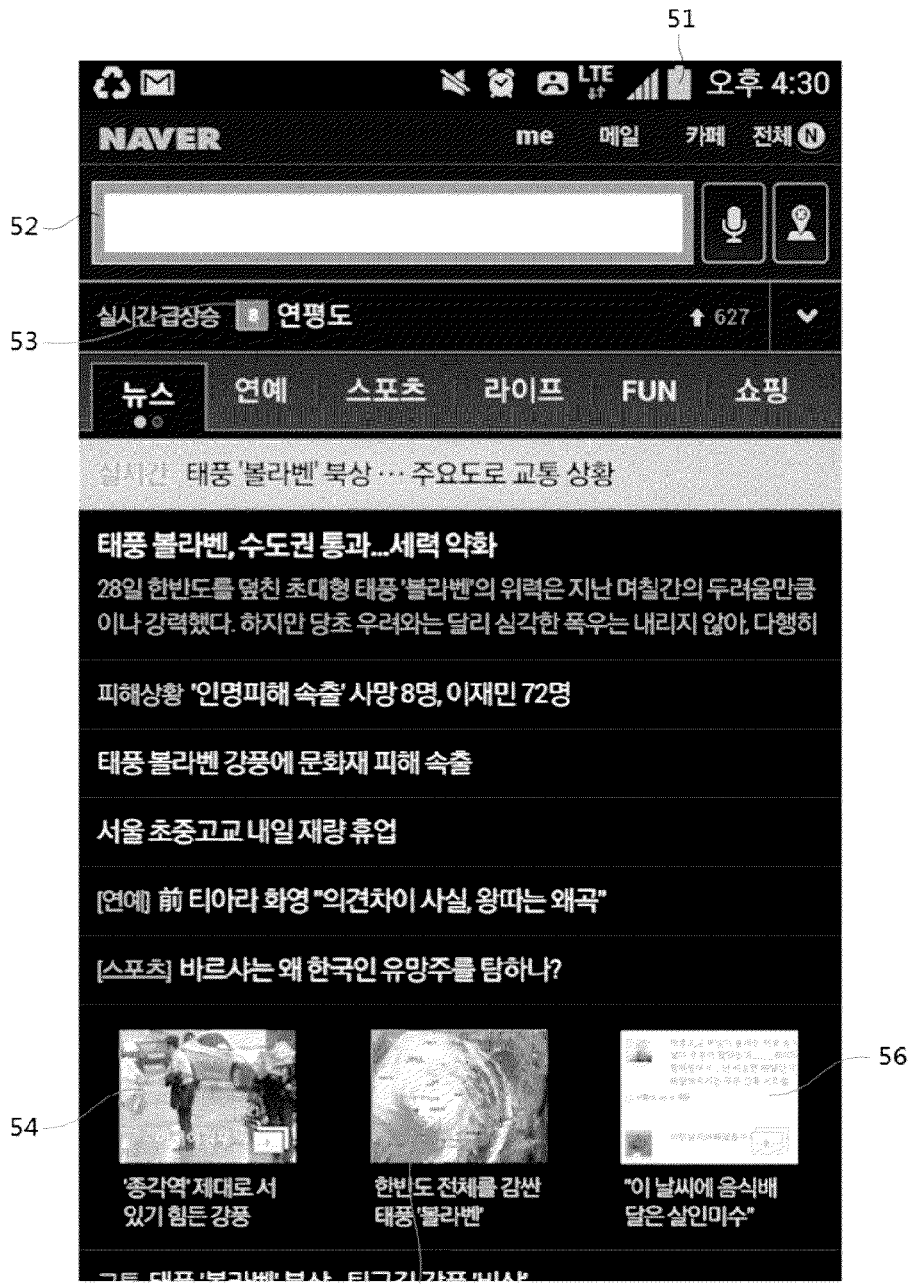
FIG. 6 is a view illustrating an output screen of an image control display device according to a first exemplary embodiment of one embodiment.

FIG. 6 is a view illustrating an output screen of an image control display device according to a first exemplary embodiment.

Hereinafter, an image controller 50 of an image control display device according to the first embodiment will be described with reference to FIGS. 3 to 6.

The image controller 50 according to the first embodiment measures luminance and chroma of each pixel of original input image data DATA1 to convert an image and generates converted output image data SDATA to transmit the generated output image data SDATA to the data driver 30.

The image controller 50 includes a measuring unit 210, an edge detecting unit 220, an inverted image generator 230, a box detecting unit 240, and an image combining unit 250.

The measuring unit 210 measures luminance and chroma of each pixel of an input image and transmits the measured luminance and chroma data to the edge detecting unit 220 and the inverted image generator 230.

The edge detecting unit 220 selects a pixel from the plurality of pixels 100 as a center pixel, performs convolution on peripheral pixel values corresponding to a Sobel operator with respect to peripheral pixel values of the center pixel to calculate edge data, and detects an edge using the calculated edge data.

The Sobel operator uses two a 3×3 kernels illustrated in equations 1 and 2 that are convolved with an input image DATA1 as illustrated in FIG. 4.

The convolution includes multiplying kernel matrices of the equations 1 and 2 by pixel values of the input image DATA1 corresponding to a mask to replace the sum of the respective values with pixel data of the center pixel.

$$x \text{ direction: } \begin{matrix} 1 & 2 & 1 \\ 0 & 0 & 0 \\ -1 & -2 & -1 \end{matrix} \quad \text{[equation 1]}$$

$$y \text{ direction: } \begin{matrix} 1 & 0 & -1 \\ 2 & 0 & -2 \\ 1 & 0 & -1 \end{matrix} \quad \text{[equation 2]}$$

The edge detecting unit 220 uses a luminance data value of a maximum luminance pixel of the input image DATA1 measured by the measuring unit 210 as a maximum value and a luminance data value of a minimum luminance pixel as a minimum value.

The edge detecting unit 220 calculates a threshold value corresponding to a predetermined first reference value in consideration of the maximum value and compares edge data with the threshold value to determine the center pixel as an edge pixel when the edge data is greater than or equal to the threshold value.

For example, when the maximum value of the input image DATA1 measured by the measuring unit 210 is 255, the minimum value is 0, and the first reference value is 50%, a threshold value calculated by performing convolution on the Sobel mask with respect to luminance data of each pixel of the input image DATA1 is 510. The edge detecting unit 220 determines a pixel as an edge pixel when the edge data is greater than or equal to 510.

At this time, the first reference value may be set as 50% that is an average luminance value of all of the pixels. A method of setting up the first reference value is not limited to the above but may be experimentally determined. That is, the method may be determined by various repetitive experiments of displaying images under various conditions to detect an edge pixel and may be arbitrarily determined.

The edge detecting unit 220 may include a luminance controller capable of arbitrarily controlling the first reference value.

As illustrated in FIG. 4, the edge detecting unit 220 performs convolution on the Sobel mask of the equation 1 from a first pixel (for example, a pixel whose position is (1,1)) of a first row of the display panel 10 as the center pixel to an adjacent pixel in an X direction to detect the edge pixel.

In the same method, the edge detecting unit 220 performs convolution from a first pixel (for example, a pixel whose position is (1,2)) of each row of the display panel 10 as the center pixel to an adjacent pixel in the X direction to detect the edge pixel.

In addition, as illustrated in FIG. 5, the edge detecting unit 220 performs convolution on the Sobel mask of the following equation 2 from a first pixel (for example, a pixel whose position is (1,1)) of a first column of the display panel 10 as the center pixel to an adjacent pixel in a Y direction to detect the edge pixel.

In the same method, the edge detecting unit 220 performs convolution from a first pixel (a pixel whose position is (2,1)) of each column of the display panel 10 as the center pixel to an adjacent pixel in the Y direction to detect the edge pixel.

The edge detecting unit 220 transmits edge data including coordinates and a grayscale value of the detected edge pixel to the box detecting unit 240.

In the above, edge detection using the 3×3 Sobel mask has been described. However, the present invention is not limited to the above but a 5×5 Sobel mask may be used and one of a Prewitt mask, a Robert mask, and a Laplacian mask may be used.

In addition, the edge detecting unit 220 may detect an edge using chroma data and a detailed method of detecting an edge using chroma data is the same as the above-described method of detecting an edge using luminance data.

The inverted image generator 230 inverts an entire image of the input image signal data DATA1 and transmits the inverted image to the image combining unit 250.

The box detecting unit 240 detects a box surrounded by the detected edge from an input image and transmits a position of a box region including coordinates of the box to the image combining unit.

To be specific, in a case where a plurality of edge pixels form an X direction line segment, when a length of the X direction line segment is greater than or equal to a second reference value (for example, when resolution is 1920×1080, 5% of a length of 1902 pixels in the X direction) of an X direction length of an input image, the box detecting unit 240 recognizes the X direction line segment as the X direction line segment of the box.

In addition, in a case where a plurality of edge pixels form a Y direction line segment, when a length of the Y direction line segment is greater than or equal to a third reference value (for example, when resolution is 1920×1080, 5% of a length of 1080 pixels in the Y direction) of a Y direction length of an input image, the box detecting unit 240 recognizes the Y direction line segment as the Y direction line segment of the box.

The box detecting unit 240 recognizes coordinates of an edge pixel in a part where the X direction line segment of the box overlap the Y direction line segment of the box as an edge of the box.

The box detecting unit 240 recognizes a region surrounded by a pair of X direction line segments and a pair of Y direction line segments and including four edges as a box region and transmits coordinates of the box region to the image combining unit 250.

The box detecting unit 240 includes a box size controller for controlling the second reference value and the third reference value to control a size of the box region.

The image combining unit 250 uses a box region in an inverted image transmitted from the inverted image generator 230 as an exception region and generates an output image SDATA in which the exception region is displayed as an image signal DATA1 as it is and a region excluding the exception region is displayed as an inverted image to transmit the generated output image SDATA to the data driver 30.

In FIG. 6, an upper end green battery shape 51, a first quadrangle 52, a second quadrangle 53, and lower end photographs 54, 55, and 56 that are colored parts represent exception regions in which input images are output as they are in accordance with input image data as described above.

The image combining unit 250 detects the exception regions 51 to 56 to generate an output image SDATA in which the exception regions are displayed in accordance with image signal data DATA1 and inverted regions that are the other regions are displayed in accordance with inverted image data as illustrated in FIG. 6.

Figure 7:
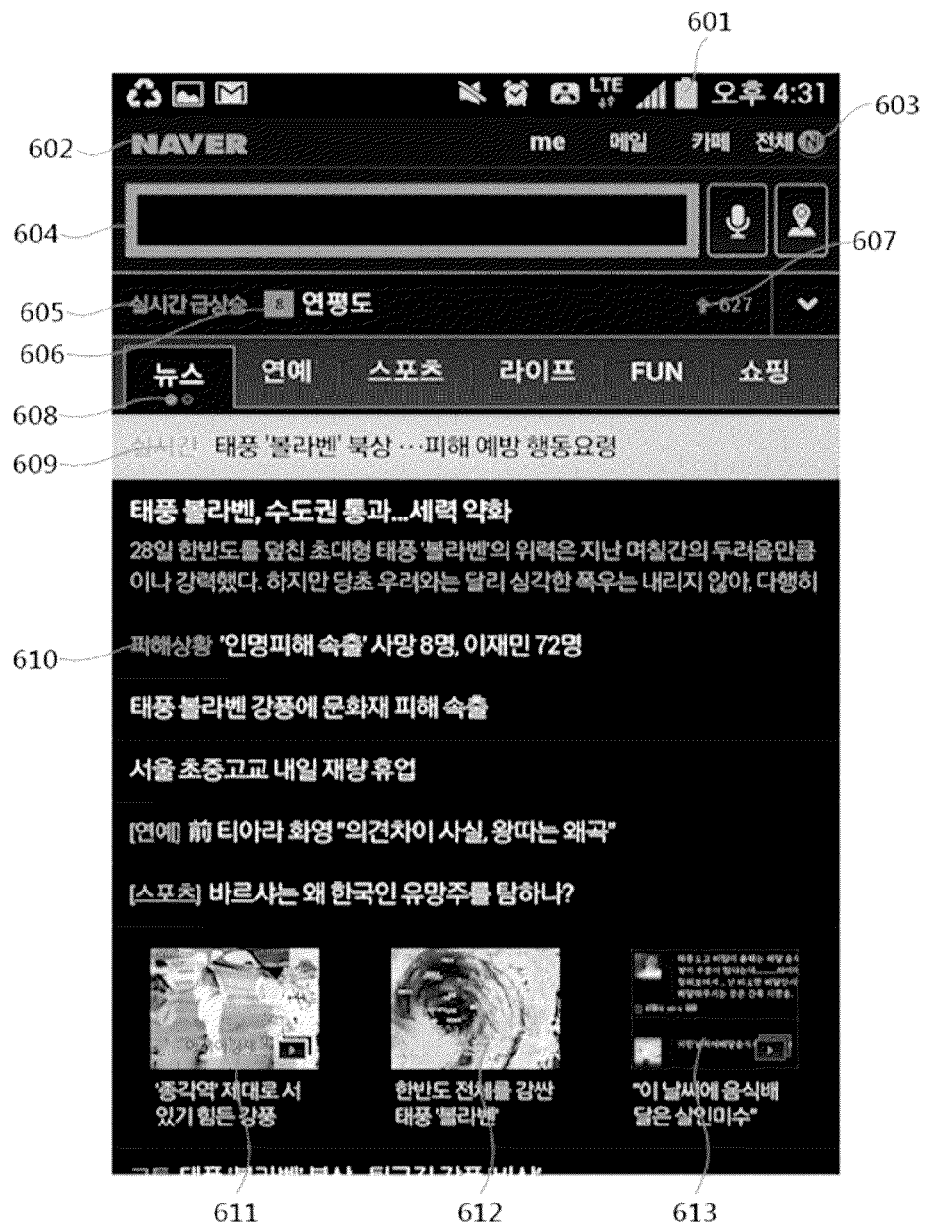
FIG. 7 is a view illustrating an output screen of an image control display device according to a second exemplary embodiment of one embodiment.

FIG. 7 is a view illustrating an output screen of an image control display device according to a second exemplary embodiment.

Hereinafter, an image controller according to the second embodiment will be described with reference to FIG. 7.

The image controller 50 according to the second embodiment measures luminance and chroma of each pixel of an original input image DATA1 to convert an image and generates a converted image signal SDATA to transmit the generated converted image signal SDATA to the data driver 30.

The image controller 50 includes the measuring unit 210, the edge detecting unit 220, the inverted image generator 230, the box detecting unit 240, and the image combining unit 250.

Since the functions of the measuring unit 210, the edge detecting unit 220, and the box detecting unit 240 are the same as described above, description thereof will be omitted.

The inverted image generator 230 calculates chroma S of each pixel of an input image signal data DATA1 using the following equation 3, does not invert color information of an image of a corresponding pixel when the chroma S of each pixel is greater than or equal to a predetermined fifth reference value, and inverts the color information of the image of the corresponding pixel when the chroma S of each pixel is less than the fifth reference value to transmit the color information to the image combining unit 250.

$$S = 1 - Max/Min \qquad \text{[Equation 3]}$$

Max=Maximum (Red, Green, Blue), Min=Minimum (Red, Green, Blue)

That is, the inverted image generator 230 inverts only the color information of the image of the pixel whose chroma is less than the fifth reference value in the input image signal data DATA1 to transmit the inverted color information to the image combining unit 250.

In addition, the inverted image generator 230 may include a first chroma controller for controlling the fifth reference value.

In FIG. 7, colored parts are regions in which chroma calculated by the image controller 50 is greater than or equal to the fifth reference value. The color display parts of FIG. 7 represent images of exception regions that are not inverted. To be specific, a green battery shape 61, a green 'NAVER' 62, a green ellipse including 'N' 63, a green quadrangle 64, a green word 'real time rapid rise' 65, a green quadrangle with a number 8 66, a red arrow 67, a green circle 68, a red word 'real time' 69, and a blue word 'damage situation' 70 of FIG. 7 are exception regions. In addition, since chroma of pixels that display lower end photographs 611, 612, and 613 of FIG. 7 are less than the fifth reference value, the photographs 611, 612, and 613 are inverted.

The image combining unit 250 generates output image data SDATA in which pixel regions whose chroma is greater than or equal to the fifth reference value that are transmitted by the inverted image generator 230 are displayed in accordance with input image data and pixel regions whose chroma is less than the fifth reference value are displayed as inverted images to transmit the generated output image data SDATA to the data driver 30.

Figure 8:
FIG. 8 is a view illustrating an output screen of an image control display device according to a third exemplary embodiment of one embodiment.

FIG. 8 is a view illustrating an output screen of an image control display device according to a third exemplary embodiment.

Hereinafter, an image controller of an image control display device according to the third embodiment will be described with reference to FIG. 8.

The image controller 50 according to the second embodiment measures luminance and chroma of each pixel of an original input image DATA1 to convert an image and generates a converted image signal SDATA to transmit the generated converted image signal SDATA to the data driver 30.

The image controller 50 includes the measuring unit 210, the edge detecting unit 220, the inverted image generator 230, the box detecting unit 240, and the image combining unit 250.

Since the functions of the measuring unit 210, the edge detecting unit 220, and the box detecting unit 240 are the same as described above, description thereof will be omitted.

The inverted image generator 230 calculates chroma of each pixel of input image signal data DATA1, does not invert color information of a pixel image whose chroma is greater than or equal to a predetermined sixth reference value, and inverts color information of a pixel image whose chroma is less than the sixth reference value to transmit the color information to the image combining unit 250.

In addition, the inverted image generator 230 may include a second chroma controller for controlling the sixth reference value.

The image combining unit 250 applies coordinates of a box to an inverted image and an image signal DTA1 to determine a pixel region and a box region whose chroma is greater than or equal to the sixth reference value as exception regions and generates output image data SDATA in which the exception regions are displayed in accordance with the input image data and inverted regions excluding the exception regions are output in accordance with the inverted image data to transmit the generated output image data SDATA to the data driver 30.

To be specific, in FIG. 8, an upper end green battery shape 71, a green quadrangle 72, a green quadrangle with a number 8 73, and lower end photographs 74, 75, and 76 that are colored parts represent exception regions in which input images are output as they are as described above.

In addition, since chroma of a green 'NAVER' 77, a green ellipse including 'N' 78, a green word 'real time rapid rise' 79, a red arrow 80, a green circle 81, a red word 'real time' 82, and a blue word 'damage situation' 83 of FIG. 8 is greater than or equal to the sixth reference value, the green 'NAVER' 77, the green ellipse including 'N' 78, the green word 'real time rapid rise' 79, the red arrow 80, the green circle 81, the red word 'real time' 82, and the blue word 'damage situation' 83 are exception regions that are not inverted.

The image combining unit 250 generates output image data SDATA in which exception regions are displayed in accordance with input image data DATA1 and regions excluding the exception regions and inverted region that are pixel regions whose chroma is less than the sixth reference value are displayed as inverted images of the inverted image generator 230 as illustrated in FIG. 8.

Figure 9:
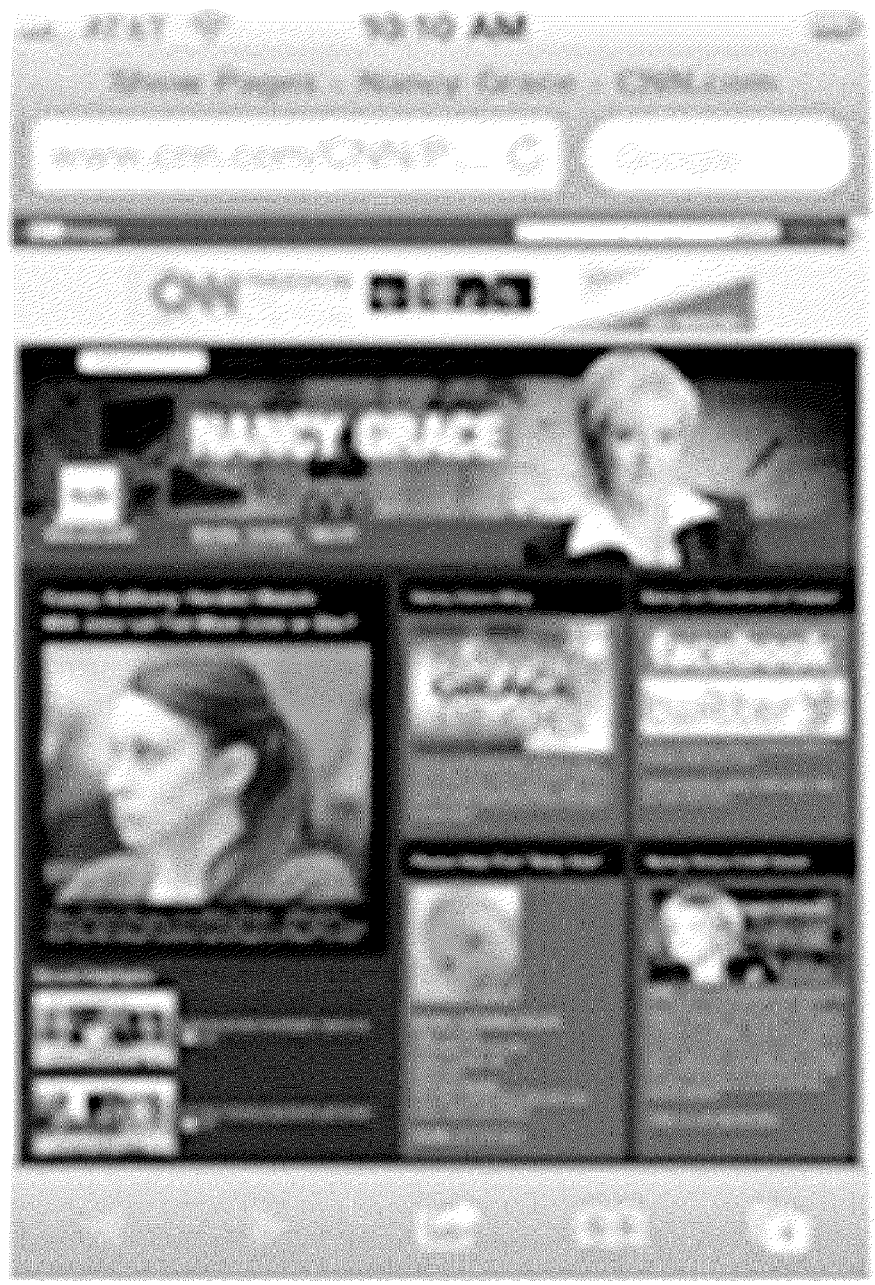
FIG. 9 is a view illustrating an output screen of an image control display device according to a fourth exemplary embodiment of one embodiment.

FIG. 9 is a view illustrating an output screen of an image control display device according to a fourth exemplary embodiment.

FIG. 9 is a color diagram. When an original image has a color close to black as illustrated in FIG. 9, the image combining unit 250 according to the fourth embodiment does not convert an image.

To be specific, the image combining unit 250 calculates an on-pixel ratio (OPR) that is a ratio of the sum of grayscale values of an input image DATA1 to the sum of maximum grayscale (fully white) values in order to determine the color close to black and generates output image data when the OPR is larger than a predetermined seventh reference value (e.g., 50%) to transmit the generated output image data to the data driver. The sixth reference value may be arbitrarily set up by a user.

For example, an image is a white image when the OPR is 100%, is a black image when the OPR is 0%, and is an image with intermediate luminance when the OPR is 50%.

In FIG. 9, when the sixth reference value is 50%, since the OPR is no more than 50%, an image is not converted but an input image is output as it is.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An image control display device, comprising:
   an image controller configured to measure at least one of luminance values and chroma values of pixels of an input image, configured to detect an edge using the at least one of luminance and chroma values by selecting a center pixel and convolving peripheral pixel values of the center pixel using a Sobel operator, configured to invert color information of the input image into inverted image data, and configured to generate output image data comprising an inverted region and an exception region, wherein the inverted region displays the inverted image data and wherein the exception region displays uninverted input image data; and
   a data driver configured to receive the output image data and to apply a plurality of data voltages corresponding to the output image data to a display panel.

2. The image control display device of claim 1, wherein the image controller comprises:
   a measuring unit configured to measure the one of luminance and chroma values of each pixel of an input image and configured to transmit the one of luminance and chroma values to an edge detecting unit and an inverted image generator;
   an edge detecting unit configured to select a center pixel, and further configured to detect an edge pixel by convolving peripheral pixel values of the center pixel using a Sobel operator,
   an inverted image generator configured to generate inverted image data by inverting color information of the input image, and to transmit the generated inverted image data to an image combining unit;
   a box detecting unit configured to detect a box region surrounded by the edge from the input image; and configured to transmit a position of a box region to an image combining unit; and
   an image combining unit configured to determine the box region from the inverted image data as the exception region, and configured to generate output image data in which the exception region displays the uninverted input image data and an inverted region excluding the exception region displays the inverted image data.

3. The image control display device of claim 1, wherein the edge detecting unit uses a luminance data value of a maximum luminance pixel of the input image that is measured by the measuring unit as a maximum value and a luminance data value of a minimum luminance pixel as a minimum value, calculates a threshold value corresponding to a predetermined first reference value in consideration of the maximum value, and compares the edge data with the threshold value to determine the center pixel as an edge pixel when the edge data is greater than or equal to the threshold value.

4. The image control display device of claim 1, wherein the edge detecting unit performs convolution on peripheral pixel values corresponding to a Sobel operator with respect to peripheral pixel values of the center pixel from a first pixel of a first row of a display panel to an adjacent pixel in at least one direction of an X direction and a Y direction to detect an edge pixel.

5. The image control display device of claim 1, wherein the edge detecting unit transmits edge data including coordinates and grayscale values of the detected edge pixel to the box detecting unit.

6. The image control display device of claim 1, wherein, in a case where the plurality of edge pixels form an X direction line segment, when a length of the X direction line segment is greater than or equal to a second reference value of an X direction length of an input image, the box detecting unit recognizes the X direction line segment as an X direction line segment of a box, and wherein, in a case where the plurality of edge pixels form a Y direction line segment, when a length of the Y direction line segment is greater than or equal to a third reference value of a Y direction length of an input image, the box detecting unit recognizes the Y direction line segment as a Y direction line segment of a box.

7. The image control display device of claim 1, wherein the box detecting unit recognizes a region surrounded by a pair of X direction line segments and a pair of Y direction line segments and including four edges as a box region and transmits a position of the box region including coordinates of the box region to the image combining unit.

8. The image control display device of claim 1, wherein the image controller comprises:

a measuring unit configured to measure the one of luminance and chroma of each pixel of an input image and configured to transmit the one of luminance and chroma values to an edge detecting unit and an inverted image generator;

an edge detecting unit configured select a center pixel, and further configured to convolve peripheral pixel values of the center pixel using a Sobel operator to calculate edge data, and configured to detect an edge pixel using the calculated edge data;

an inverted image generator configured to calculate chroma of each pixel of the input image, not inverting color information of a pixel image whose chroma is greater than or equal to a predetermined fifth reference value, and inverting color information of a pixel image whose chroma is less than the fifth reference value to transmit the color information to an image combining unit; and an image combining unit configured to determine a pixel region whose chroma is greater than or equal to the fifth reference value as the exception region to generate an output image in which the exception region displays uninverted input image data and an inverted region excluding the exception region displays the inverted image data.

9. The image control display device of claim 1, wherein the image controller comprises:

a measuring unit configured to measure the one of luminance and chroma values of each pixel of an input image and configured to transmit the one of luminance and chroma values to an edge detecting unit and an inverted image generator;

an edge detecting unit configured to select a pixel as a center pixel, and further configured to convolve peripheral pixel values of the center pixel using a Sobel operator to calculate edge data, and configured to detect an edge pixel using the calculated edge data;

an inverted image generator configured to calculate chroma of each pixel of the input image, not inverting color information of a pixel image whose chroma is greater than or equal to a predetermined sixth reference value, and inverting color information of a pixel image whose chroma is less than the sixth reference value to transmit the color information to an image combining unit;

a box detecting unit for detecting a box surrounded by the detected edge from the input image and transmitting a position of a box region to an image combining unit; and an image combining unit configured to determine a pixel region whose chroma is greater than or equal to the sixth reference value and the box region as the exception regions to generate output image data in which the exception regions display uninverted input image data and inverted regions excluding the exception regions display the inverted image data.

10. The image control display device of claim 1, wherein the image combining unit calculates a ratio of the sum of the input image grayscale values to the sum of maximum grayscale values and generates the output image data when the ratio is larger than a predetermined seventh reference value to transmit the generated output image data to the data driver.

11. The image control display device of claim 3, wherein the edge detecting unit comprises a luminance controller for controlling the first reference value.

12. The image control display device of claim 6, wherein the box detecting unit comprises a box size controller for controlling the second reference value and the third reference value.

13. The image control display device of claim 8, wherein the inverted image generator comprises a first chroma controller for controlling the fifth reference value.

14. The image control display device of claim 9, wherein the inverted image generator comprises a second chroma controller for controlling the sixth reference value.

15. An image control method, comprising:

measuring luminance and chroma of each pixel of an input image and transmitting measured luminance and chroma values;

selecting a pixel as a center pixel and detecting an edge pixel using edge data calculated by convolving peripheral pixel values of the center pixel using a Sobel operator;

generating inverted image data obtained by inverting color information of the input image;

detecting a box surrounded by the detected edge from the input image; and detecting the box region from the inverted image as the exception region to generate output image data in which the exception region displays uninverted input image data and an inverted region excluding the exception region displays the inverted image data.

16. An image control method, comprising:

measuring luminance and chroma of each pixel of an input image and transmitting measured luminance and chroma values;

selecting a pixel as a center pixel, convolving peripheral pixel values of the center pixel using a Sobel operator to calculate edge data, and detecting an edge pixel using the calculated edge data;

calculating chroma of each pixel of the input image not to invert color information of a pixel image whose chroma is greater than or equal to a predetermined fifth reference value and to invert color information of a pixel image whose chroma is less than the fifth reference value; and detecting a pixel region whose chroma is greater than or equal to the fifth reference value as the exception region to generate an output image in which the exception region displays uninverted input image data and an inverted region excluding the exception region displays the inverted image data.

17. An image control method, comprising:

measuring luminance and chroma of each pixel of an input image and transmitting measured luminance and chroma values;

selecting a pixel as a center pixel, convolving peripheral pixel values of the center pixel using a Sobel operator to calculate edge data, and detecting an edge pixel using the calculated edge data;

calculating chroma of each pixel of the input image not to invert color information of a pixel image whose chroma is greater than or equal to a predetermined sixth reference value and to invert color information of a pixel image whose chroma is less than the sixth reference value;

detecting a box surrounded by the detected edge from the input image and transmitting a position of a box region; and detecting a pixel region whose chroma is greater than or equal to the sixth reference value and the box region as the exception regions to generate output image data in which the exception regions display uninverted input image data and inverted regions excluding the exception regions display the inverted image data.

18. The image control method of claim 15, further comprising calculating a ratio of the sum of the input image grayscale values to the sum of maximum grayscale values and generating the output image data when the ratio is larger than a predetermined seventh reference value to transmit the generated output image data to the data driver.

* * * * *